United States Patent

[11] 3,628,236

| [72] | Inventors | Roderick G. Rohrberg<br>Torrance;<br>Don E. Harvey, Inglewood, both of Calif. |
|---|---|---|
| [21] | Appl. No. | 21,674 |
| [22] | Filed | Mar. 23, 1970 |
| [45] | Patented | Dec. 21, 1971 |
| [73] | Assignees | North American Rockwell Corporation;<br>Air Products and Chemicals, Inc.<br>Allentown, Pa., part interest to each<br>Original application Feb. 23, 1968, Ser. No. 707,819, now abandoned. Divided and this application Mar. 23, 1970, Ser. No. 21,674 |

[54] TUBE JOINING METHOD AND MEANS
1 Claim, 22 Drawing Figs.

[52] U.S. Cl. .................................................... 29/482, 29/475
[51] Int. Cl. .................................................... B23k 1/20, B23k 31/02
[50] Field of Search .......................................... 29/475, 482, 493; 228/15, 29; 269/55

[56] References Cited
UNITED STATES PATENTS

| 3,254,404 | 6/1966 | Becker .................. | 29/482 X |
| 3,324,275 | 6/1967 | Peignen ................. | 228/29 X |

*Primary Examiner*—John F. Campbell
*Assistant Examiner*—Richard Bernard Lazarus
*Attorneys*—William R. Lane, Charles F. Dischler and Harold H. Card, Jr.

ABSTRACT: A portable carriage adapted to be mounted on a tubular workpiece is used to perform cutting operations followed by in place welding operations on such workpiece using two subassemblies interchangeably mounted on the carriage, one for cutting and one for welding. The carriage is rotatable around the stationary workpiece or may be held stationary while the workpiece rotates. After preliminary trimming, fusion welding is progressively accomplished in a circular path to join the abutting ends of the workpiece components.

PATENTED DEC 21 1971
3,628,236
SHEET 01 OF 10
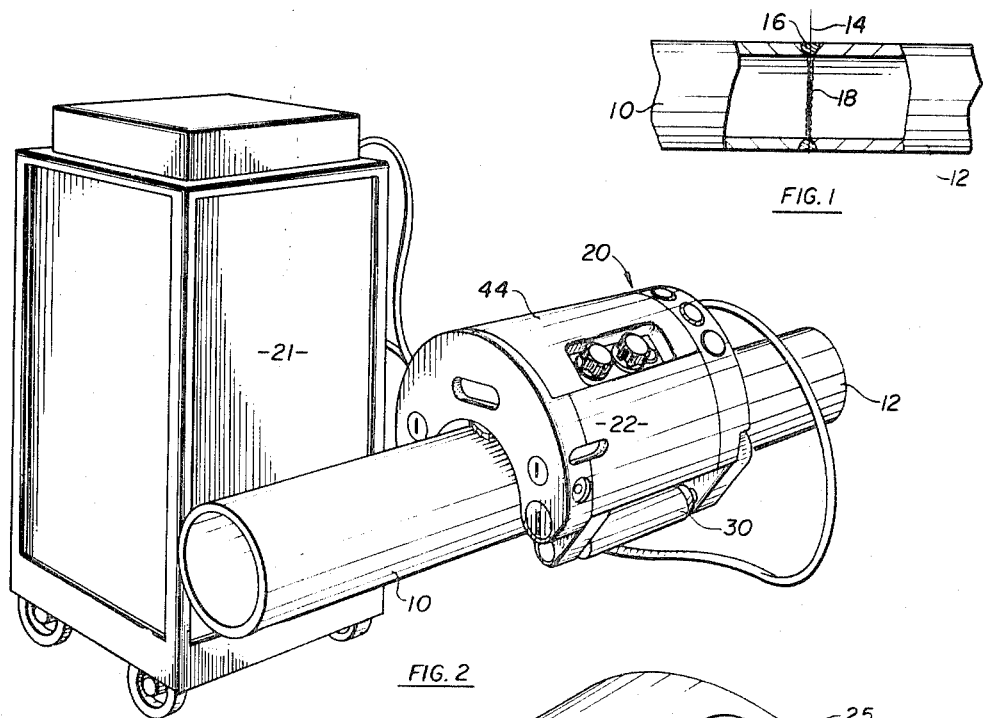
FIG. 1
FIG. 2
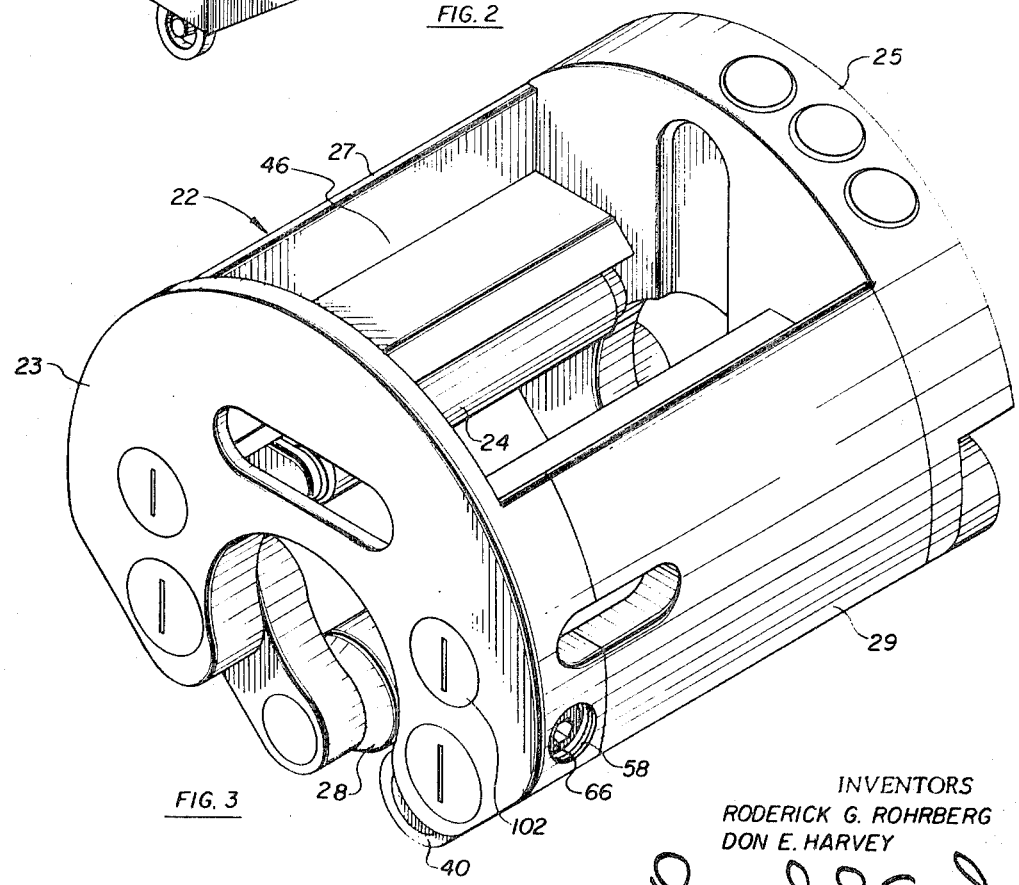
FIG. 3
INVENTORS
RODERICK G. ROHRBERG
DON E. HARVEY
ATTORNEY

INVENTORS
RODERICK G. ROHRBERG
DON E. HARVEY

ATTORNEY

INVENTORS
RODERICK G. ROHRBERG
DON E. HARVEY

ATTORNEY

INVENTORS
RODERICK G. ROHRBERG
DON E. HARVEY

ATTORNEY

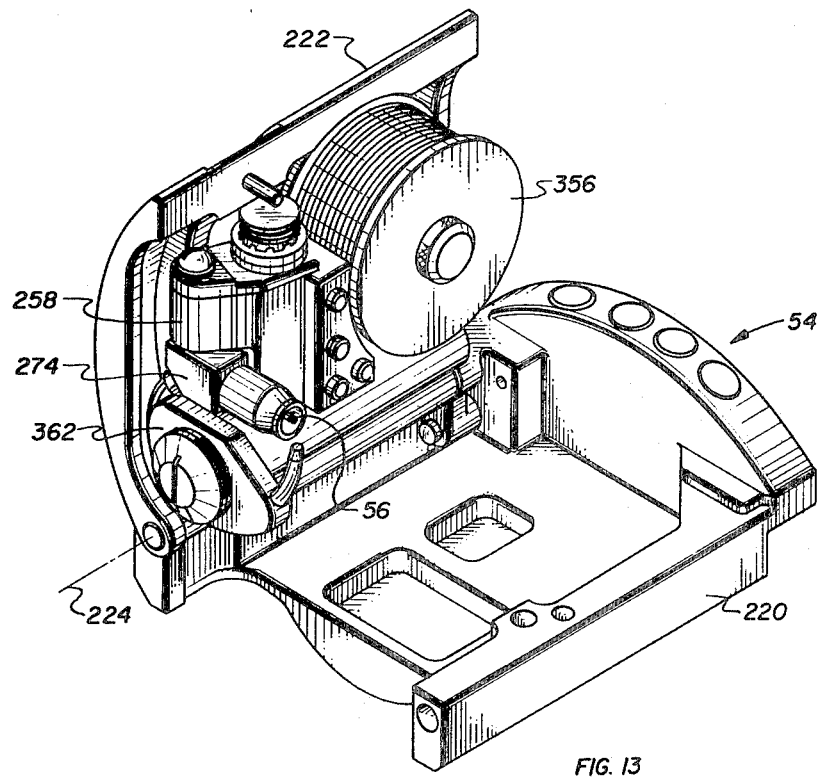
FIG. 13
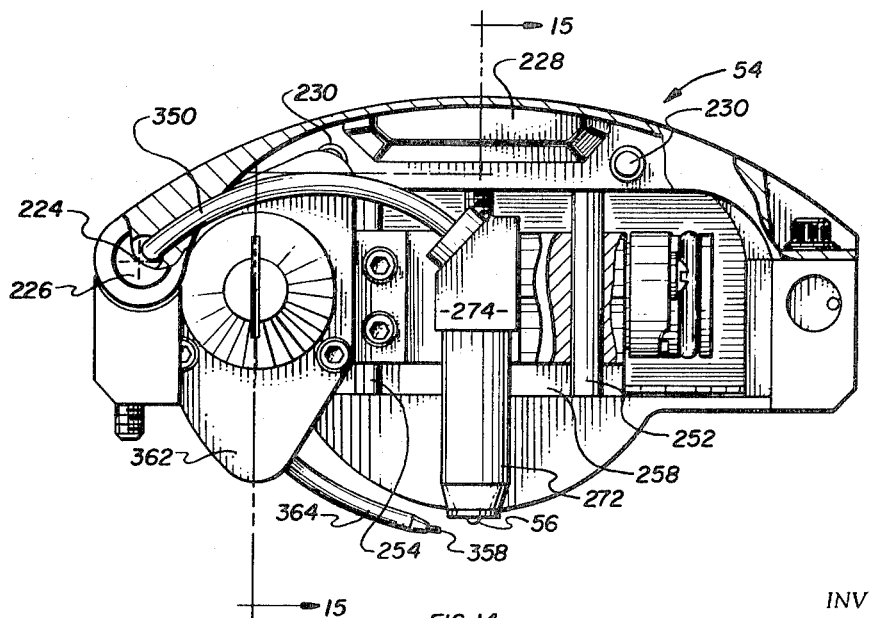
FIG. 14
INVENTORS
RODERICK G. ROHRBERG
DON E. HARVEY
ATTORNEY

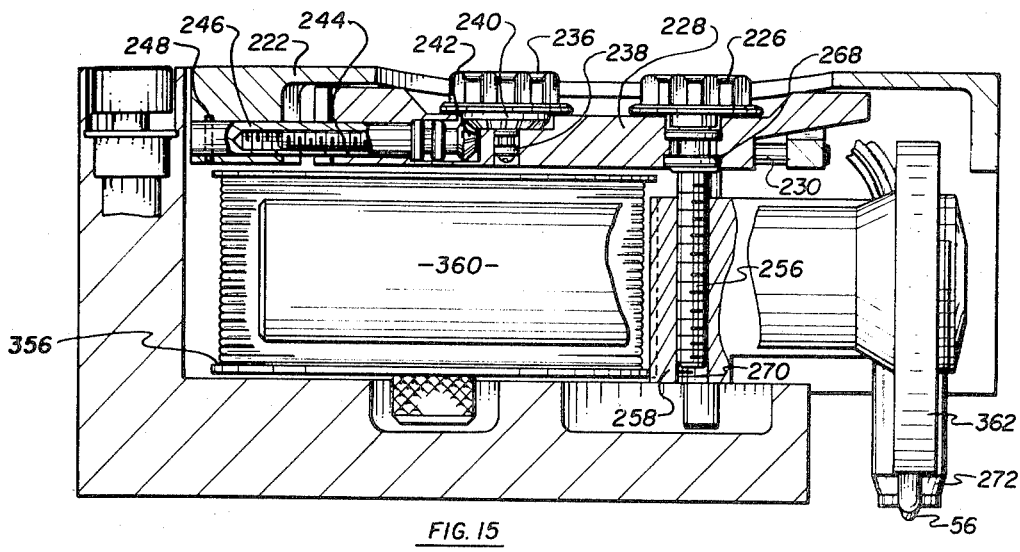

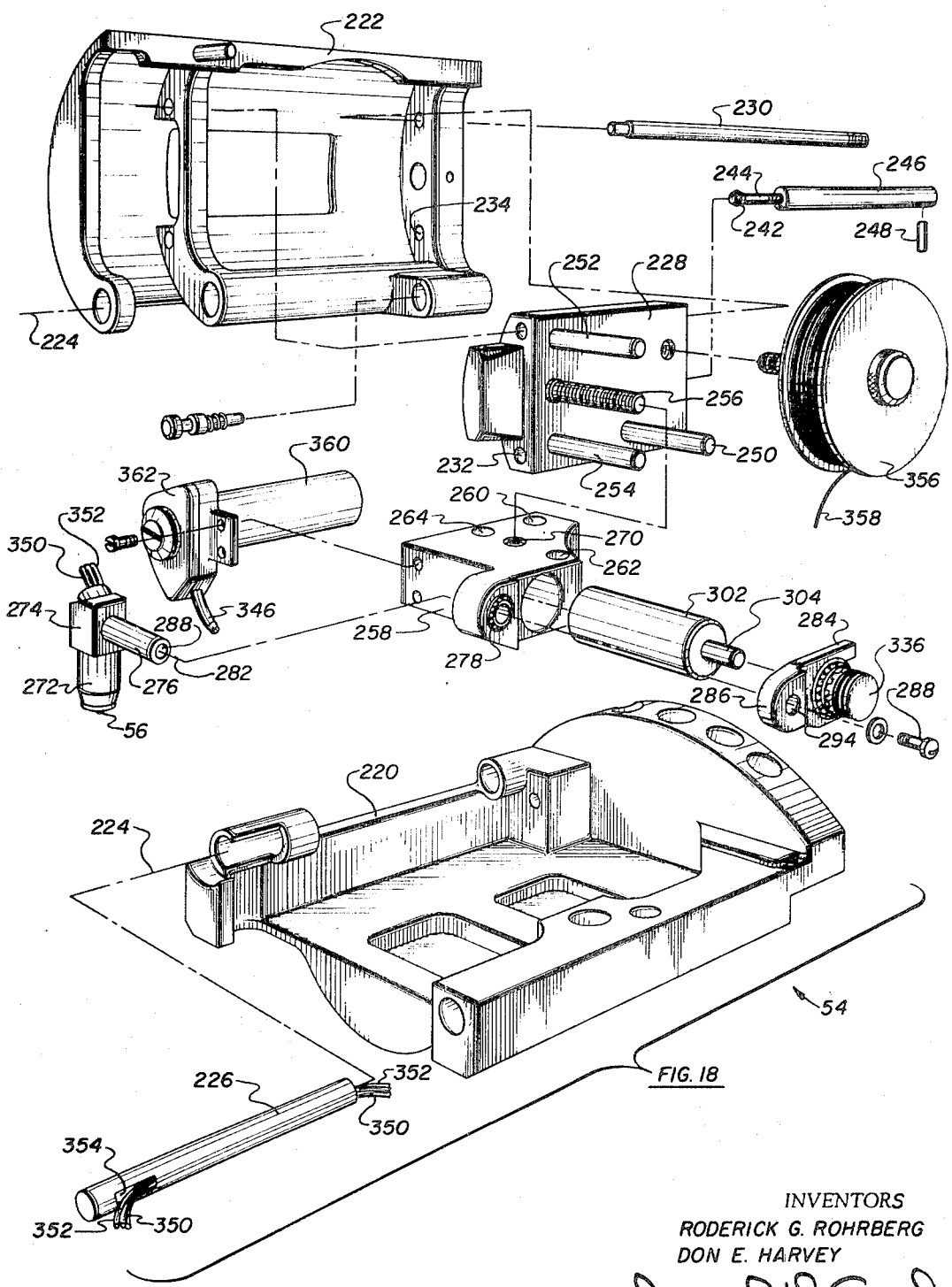
FIG. 18
INVENTORS
RODERICK G. ROHRBERG
DON E. HARVEY
ATTORNEY

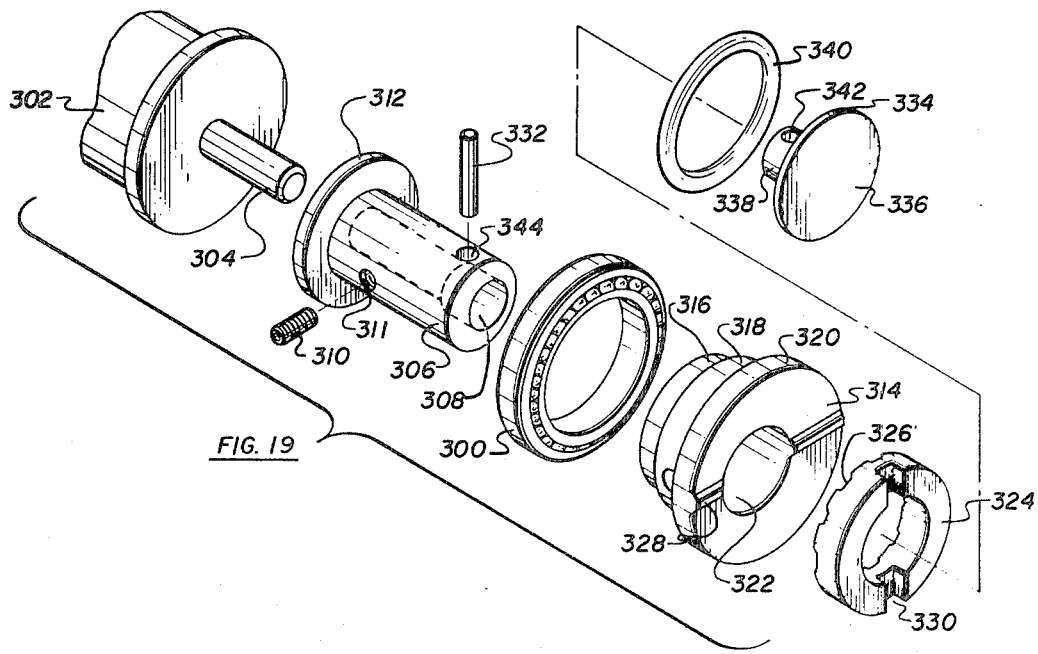
FIG. 19
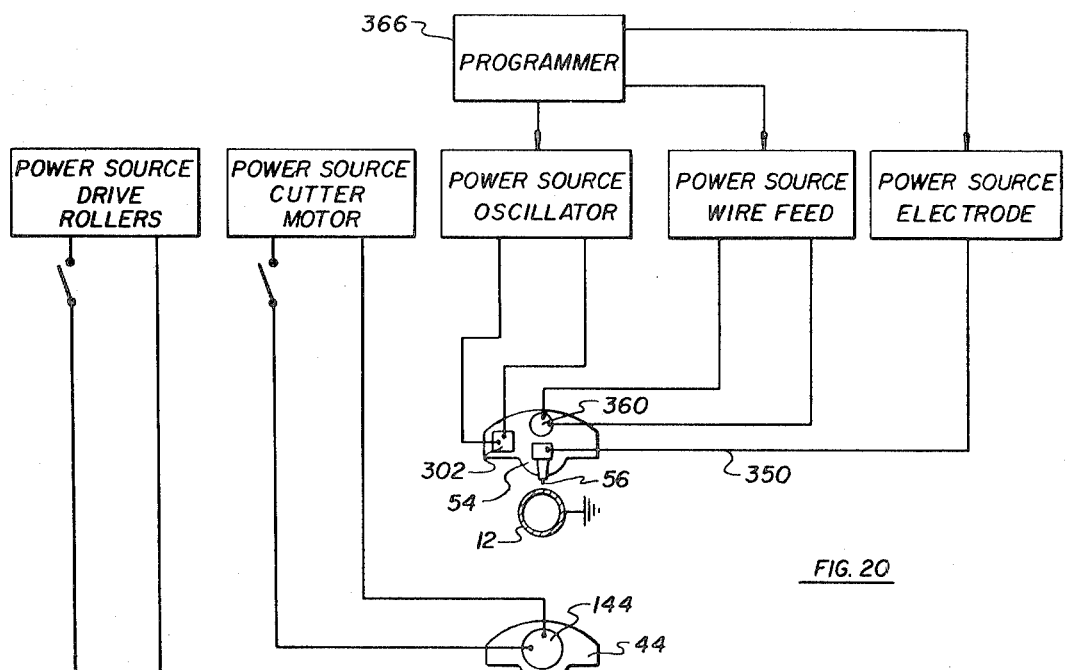
FIG. 20
INVENTORS
RODERICK G. ROHRBERG
DON E. HARVEY
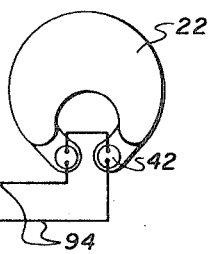
ATTORNEY 3,628,236

1

TUBE JOINING METHOD AND MEANS

This is a division of application Ser. No. 707,819 filed Feb. 23, 1968, now abandoned.

SUMMARY OF THE INVENTION

According to an illustrative embodiment of this invention, compact, lightweight and portable combination tool 20 is used to join adjacent tubular conduit sections 10 and 12 with their ends in substantially mutual contact along a place of abutment 14 by a fusion weld nugget 16 progressively forming weld seam 18 as seen in FIG. 1. Tool 20 comprises frame or chassis 22 adapted to be supported on the workpiece components by a plurality of rollers such as 24, 26, 28 and 30 seen in FIG. 5. The stated rollers are adapted to move frame 22 around the stationary workpiece components 10 or 12, or alternatively to rotate the workpiece components while mounted within the stationary frame. The lower rollers 28 and 30 are adjustable into a wide range of different positions to accommodate different sizes of workpieces as suggested by cross-sectional areas 32 and 34. Resilient biasing force to hold rollers 28 and 30 in close continuous contact with the workpiece surface is provided by adjustable torsion bars. Thus, for example, torsion bar 36 shown in FIG. 4 is adapted for rotation by jack screw 38 whereby movable link 40 positions roller 30. Roller 28 is similarly mounted with its separate torsion bar, in a manner oppositely corresponding with the biasing means shown for roller 28. Motor 42 contained within roller 30 drives the same during the cutting and the subsequent welding operations, while roller 28 is similarly driven by a separate motor mounted therewith.

Cutting tool subassembly 44 shown in FIG. 7 is removably mounted within cradle cavity 46 in frame 22 best seen from FIG. 3, and includes milling cutter 48 for trim cutting a tube end while frame 22 rotates around the tube.

Welding tool subassembly 54 shown in FIG. 8 is also releasably positionable within cradle cavity 46 of frame 22 and comprises and electrode 56 with appropriate wire feed, oscillation and position adjustment means for progressive fusion welding on a workpiece while frame 22 rotates about the same.

BRIEF DESCRIPTION OF DRAWINGS

FIG. 1 shows a type of conduit connection adapted to be precut and precision welded by the apparatus disclosed herein;

FIG. 2 shows a general perspective view of the apparatus disclosed herein operatively mounted on a workpiece component for trim cutting prior to welding;

FIG. 3 is a perspective view of the main supporting frame from the welding tool shown in FIG. 2;

FIG. 13 is a general perspective view of the welding tool subassembly shown in FIG. 8;

FIG. 14 is an end elevational view, partly in cross section, of the structure shown in FIG. 13;

FIG. 15 is a cross-sectional view taken generally through the longitudinal center of the structure shown in FIG. 14;

FIG. 16 is an isolated view of the electrode mounting arrangement from the structure shown in FIGS. 13-15, showing the oscillation movement thereof and with portions of the oscillation subassembly omitted for the sake of clarity;

FIG. 17 is an isolated plan view of detailed structure for adjusting oscillation of the electrode in the structure shown by FIGS. 13-16, inclusive;

FIG. 18 is an exploded view in perspective of the welding tool subassembly shown in FIGS. 8 and 13-17, inclusive;

FIG. 19 is an exploded view in perspective of the oscillation adjustment detailed structure shown in FIG. 17;

FIGS. 19A and 19B are diagrammatic representations of the oscillating subassembly of FIG. 19 in two different positions of adjustment, and FIG. 20 is an electrical schematic diagram of an illustrative circuit for operating the structure shown in FIGS. 1-19.

DETAILED DESCRIPTION OF INVENTION

Figure 4:
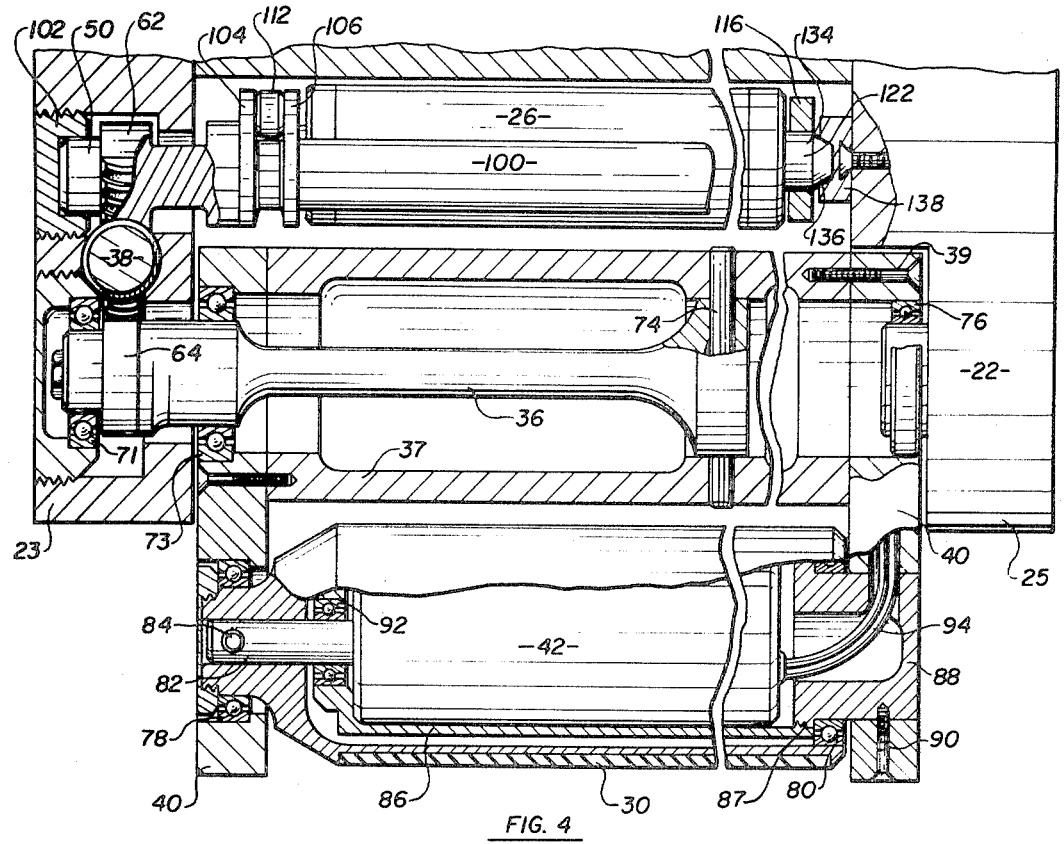
FIG. 4 is an isolated view, partly in cross section, of a portion of the structure shown in FIG. 3 and generally representing a view taken on line 4—4 in FIG. 5.

It is a principal object of the invention in this case to provide a compact, lightweight and portable combination tool for joining generally cylindrical workpiece portions such as tubular conduits or the like to each other at the adjoining ends thereof.

Another object in this case is to provide apparatus as stated in the above object capable of use in crowded equipment areas involving severely limited working space.

It is a further object of this invention to provide apparatus as set forth in the above objects having a wide range of adaptability to different workpiece sizes and materials.

It is also an object in this case to provide apparatus as set forth in the above objects whereby preliminary trim cutting operations and subsequent in-place welding operations may be performed at precisely the same workpiece location using the same tooling setup by interchangeable subassemblies for each stated operation.

Referring to the drawings briefly described above and particularly to FIG. 2, portable combination tool 20 may be seen operatively associated with a relatively thick- or heavy-walled tubing section 12. Combination tool 20 is supported entirely on workpiece 12 and is operatively associated with suitable control devices (not shown) and appropriate power sources such as electrical power unit 21. Workpiece 12 may be vertical, horizontal, or in any other position of angularity and location, since the apparatus disclosed herein is particularly adapted for field use and is not limited to bench use. Workpiece 12 may be cut to any desired length by situating the tool on the workpiece so that milling cutter 48 will be positioned at the precise location where cutting is desired. With tool 20 thus mounted, operation of cutting wheel 48 in a manner described more fully below is accompanied by simultaneous rotation of either workpiece 12 or tool 20, since tool 20 is mounted for rotation relative to the workpiece about the center longitudinal axis of substantially cylindrical tube 12.

Following the cutting operation, another workpiece such as tube 10 substantially corresponding in size with tube section 12 may be joined to the newly cut terminal end of tube 12 by preplacing tube 10 in abutting contact therewith and replacing tool subcombination assembly 44 by welding tool subassembly 54 shown in FIGS. 8 and 13-15, after which welding may be accomplished by rotation of tool 20 simultaneously during welding in a manner corresponding with its rotation during the cutting operation. Thus, tool 20 essentially comprises a chassis or frame 22 shown in FIG. 3 having a cradle cavity 46 dimensioned and adapted to receive and contain either of the tool subassemblies 44 or 54. Frame 22 essentially consists of two end portions 23 and 25 secured to two oppositely corresponding side portions 27 and 29 by a plurality of screws 31. Frame 22 is supported on the workpiece by four rollers 24, 26, 28 and 30 mounted within the frame. Rollers 24 and 28 are simultaneously movable for initial adjustment as required to mount tool 20 on a particular size workpiece, while rollers 26 and 30 are similarly movable in unison by a single adjustment mechanism described more fully below. The supporting, positioning and operating relationships described in connection with rollers 26 and 30 also apply to rollers 24 and 28, respectively.

Figure 5:
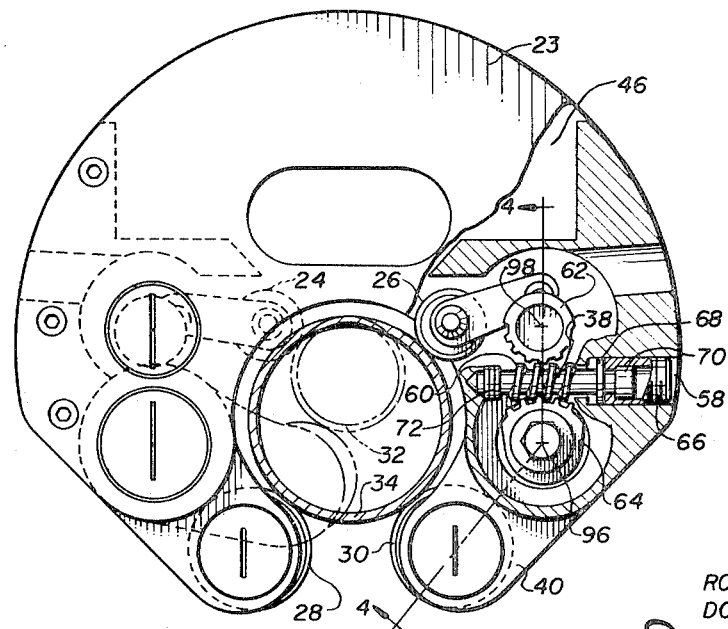
FIG. 5 is an end elevational view, partly in cross section, of the supporting frame shown in FIGS. 3 and 4.

Thus, referring to FIGS. 4 and 5, for example, it may be seen that roller 30 is adjustable to maintain rolling contact with workpiece conduit 34, and similarly adjustable for smaller diameter workpieces such as conduit 32 shown in broken lines. The foregoing adjustments are accomplished by rotation of jackscrew 38 which generally comprises an elongate shaft rotatably mounted within a cavity 58 situated within frame 22. Jackscrew 38 is provided with a plurality of worm gear threads 60 operatively engaging worm gear pinions or pinion segments 62 and 64 situated above and below jackscrew 38, respectively, in the view shown by FIG. 5. Suitable means for preventing translational movement of jackscrew 38 along its center longitudinal axis may be provided such as suggested by thrust sleeve 66 threadably secured within cavity 58 and operatively related to flanged portions 68 and 70 of jackscrew 38. A suitable bearing support of any appropriate type may be provided at the distal end of jackscrew 38 as suggested by bearing 72.

Initially considering adjustment of roller 28 by means of jackscrew 38, it may be seen from FIGS. 4 and 5 that rotation of jackscrew 38 results in rotation of worm gear pinion segment 64 which is secured to one end of torsion bar 36 contained within housing tube 37 which is affixed to link 40 by a plurality of screws 39. Torsion bar 36 is supported by suitable bearings for limited rotation within frame 22 such as suggested by bearings 71 and 73. Torsion bar 36 is secured to housing 37 and hence to movable link 40 by appropriate means such as pin 74 whereby rotation of torsion bar 36 causes rotation of link 40 about a centerline 96 through the torsion bar. Link 40 is provided with bearing support means to permit its rotation relative to frame 22, such means illustratively comprising bearings 73 and 76. Rotation of link 40 produced by rotation of jackscrew 38 will continue until roller 30 mounted on the lower end of the link firmly contacts the surface of workpiece 34, for example, shown in FIG. 5, after which further rotation of link 40 is resisted. Roller 30 is mounted for rotation relative to link 40 by suitable bearing means such as suggested by bearings 78 and 80 shown in FIG. 4. Roller 30 is rotated within the mentioned bearings by a drive motor 42, the output shaft 82 of which is pinned to the roller by suitable means such as pin 84. Motor 42 is affixed to link 40 by housing means coaxially situated within roller 30 and comprising substantially cylindrical sleeve 86 secured by threads 87 or other suitable means to housing support means 88 which in turn is secured to link 40 by force fitting or by one or more screws such as screw 90 shown in FIG. 4. Motor 42 is force-fit or otherwise immovably secured within housing 86 while output shaft 82 of the motor is supported for rotation relative to housing 86 by bearing 92. Electrical power for motor 42 is supplied by suitable means such as suggested by leads 94 connected with an external power source suggested in the schematic view of FIG. 20.

From the foregoing description and the structure shown in FIGS. 4 and 5, it will be understood that rotation of jackscrew 38 causes rotation of torsion bar 36 and link 40 until roller 30 contacts workpiece 34, after which further rotation of jackscrew 38 produces rotation of the left end of torsion bar 36 in the view shown by FIG. 4, while the right end of the torsion bar is restrained against rotation due to resistance from pin 74 secured within link 40 to which roller 30 is secured in rotating relationship. Thus, biasing force tending to hold roller 30 in firm continuous contact with workpiece 34 will result from torque applied by torsion bar 36 due to the stated difference in amount of rotation between the left- and right-hand ends of the torsion bar, the amount of torque depending upon the amount of additional rotation of jackscrew 38 after roller 30 is no longer able to move radially about a center 96 through worm gear pinion segment 64. Due to the resilient biasing of drive roller 30 into contact with workpiece 34, the mentioned roller is maintained in firm continuous contact with tubular workpiece throughout the entire path of relative movement between tool 20 and the workpiece in spite of such common workpiece discrepancies as local areas of flatness, ridges or roughness, and nonuniform diameter.

With further regard to the adjustments achieved by jackscrew 38, it may be seen from FIGS. 4 and 5 that upper pinion segment 62 operatively engages threads 60 on the jackscrew and is rotated about an axis 98 when jackscrew 38 is rotated. Axis 98 coincides with the longitudinal axis through substantially cylindrical shaft 100 operatively associated with idler roller 26. Gear segment 62 is formed on shaft 100 whereby the shaft rotates when jackscrew 38 causes rotation of the gear segment. Shaft 100 is provided with suitable bearing supports at either end thereof to permit its rotation relative to frame 22, such as plastic bearing plugs 50 and 52 shown in FIG. 6. Plug 50 is shown in FIG. 4, and is rotationally supported within a hollow threaded cap 102 secured to frame 22. Shaft 100 is provided with a plurality of upstanding substantially parallel lugs or brackets 104, 106, 108 and 110 arranged in pairs as seen from FIG. 6. Lugs 104 and 106, for example, have a space or gap therebetween adapted to receive one end of a link 112 which is pivotally associated therewith by suitable means such as pivot pin 114. Brackets 108 and 110 receive an end of link 116 which corresponds exactly in shape and function with link 112 and is pivotally secured to brackets 108 and 110 by pin 118.

Figure 6:
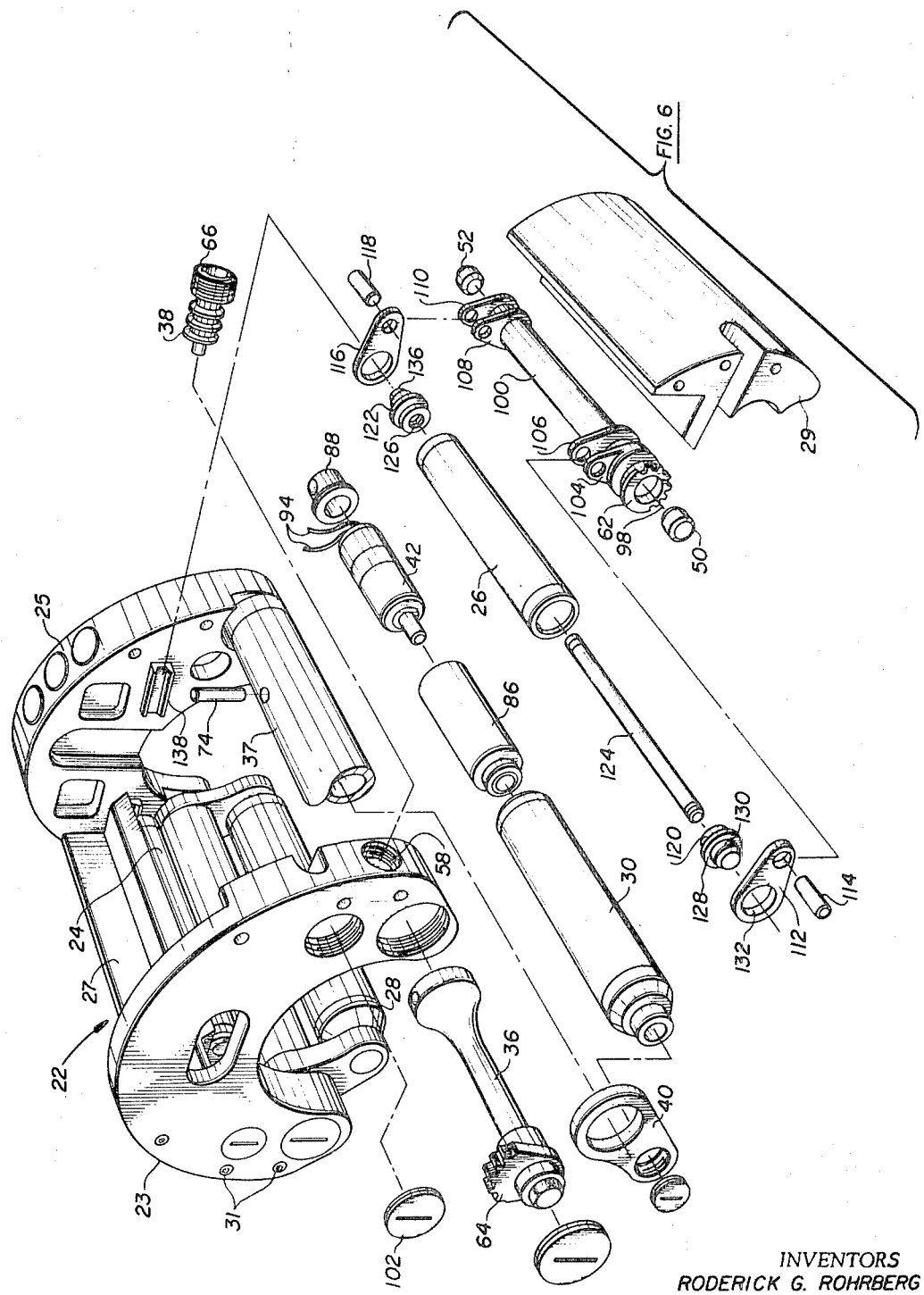
FIG. 6 is a perspective view, partly exploded, of the structure shown in FIGS. 3, 4 and 5.

Referring to FIG. 6, it may be seen that roller 26 has an end closure plug 120 and 122 at each end thereof, and that the stated plugs are retained by a center shaft 124 threadably secured to the plugs by engagement within threaded holes in the center of each plug as indicated by reference numeral 126 in FIG. 6. Each of the plugs 120 and 122 is provided with an annular flange as shown by flange 128 on plug 120, the stated flanges being forced against the ends of roller 26 when items 120, 122, 124 and roller 26 are assembled in operative relationship. Each of the plugs is further provided with a rotatable bearing surface adapted to contact a hole in each of the links to which the plugs are respectively connected. The foregoing relationship is illustratively shown by bearing surface 130 on plug 120 which fits within hole 132 on link 112 as suggested in FIG. 6, and by bearing surface 134 on plug 122 shown in FIG. 4. On the distal end of each plug 120 and 122, opposite from the threaded connection joining the plugs to rod 124, is a generally conical cam surface illustrated by surface 136 on plug 122 seen in FIG. 4. Each of the cam surfaces thus provided at opposite ends of roller 26 is adapted to make rolling contact with a channel-shaped guide, one of which is designated by reference numeral 138 and is visible in FIGS. 4 and 6.

Referring to FIG. 4, it will be understood from the structure shown therein and discussed hereinabove that rotation of jackscrew 38 causes rotation of gear segment 62 and bracketed tube 100. Movement of brackets 104–110 resulting from rotation of tube 100 applies force to links 112 and 116 through pins 114 and 118, respectively, whereby roller 26 moves toward or away from roller 24, in the view shown by FIG. 5. The direction of translational movement of roller 26 will depend upon the direction of rotation of jackscrew 38 and gear segment 62, while the path of such roller movement will be determined by the restraining sides of guide elements 138 acting upon the cam surface 136 on each end of roller 26.

Figure 7:
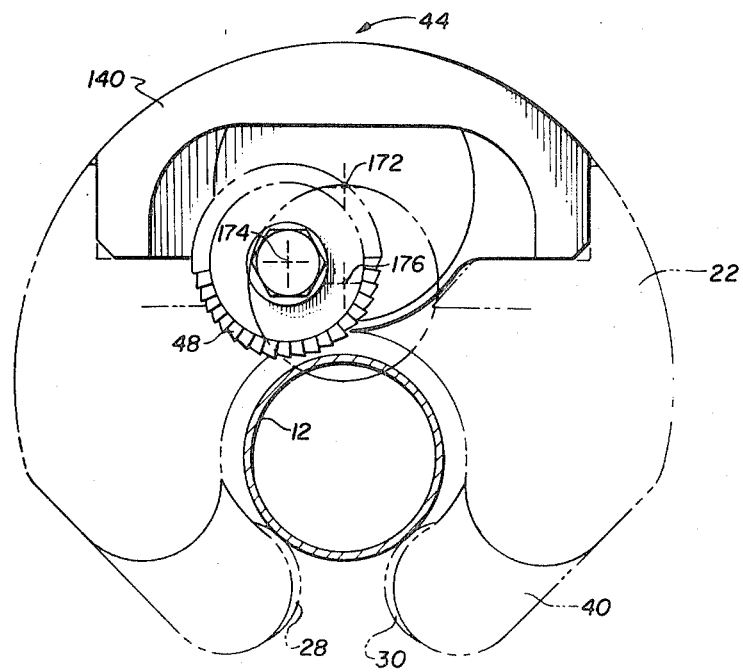
FIG. 7 is an end elevational view of a cutting head adapted for mounting in the frame shown by FIG. 3.
Figure 8:
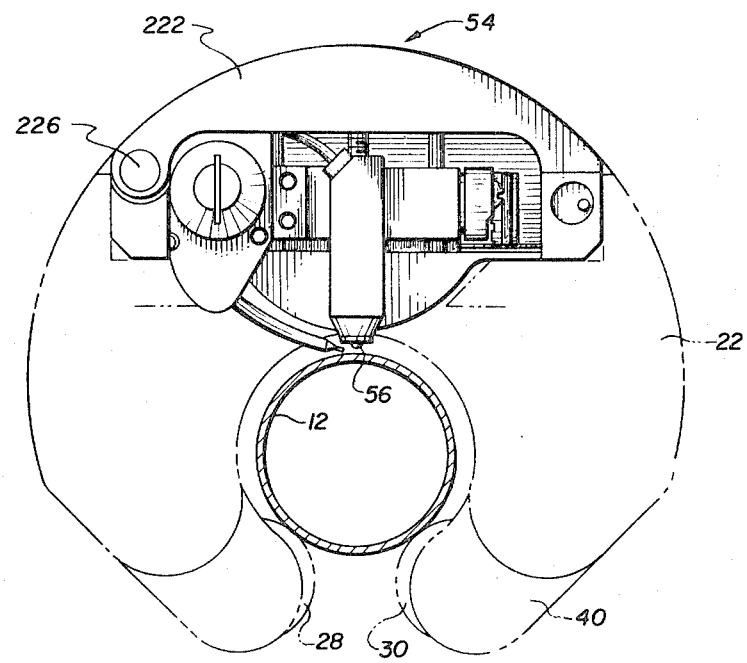
FIG. 8 is an end elevational view of a welding head adapted for mounting in the frame shown by FIG. 3.

As suggested hereinabove and shown by FIGS. 7 and 8, frame or chassis 22 is adapted to receive and support two different types of tools in operative relationship with the workpiece component upon which the chassis is supported. Thus, FIG. 7 shows cutting head 44 with milling cutter 48 rotatively mounted thereon, while FIG. 8 shows welding head 54 with electrode 56 mounted thereupon and operatively positioned for welding on workpiece component 12. As described more fully below, independent power means for the operation of cutter 48 and for electrode 56 may be provided separate from the power means used to cause movement of chassis 22 about workpiece 12 during the cutting or welding operations.

Figure 9:
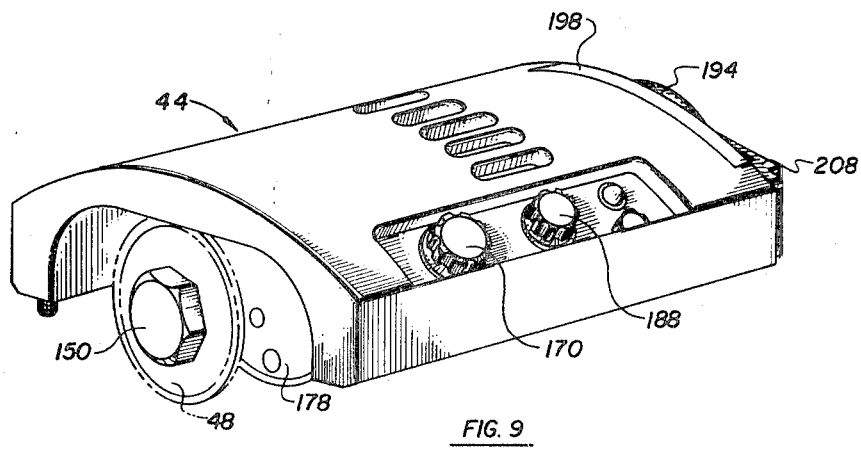
FIG. 9 is a general perspective view of the cutting tool subassembly shown in FIG. 7.
Figure 10:
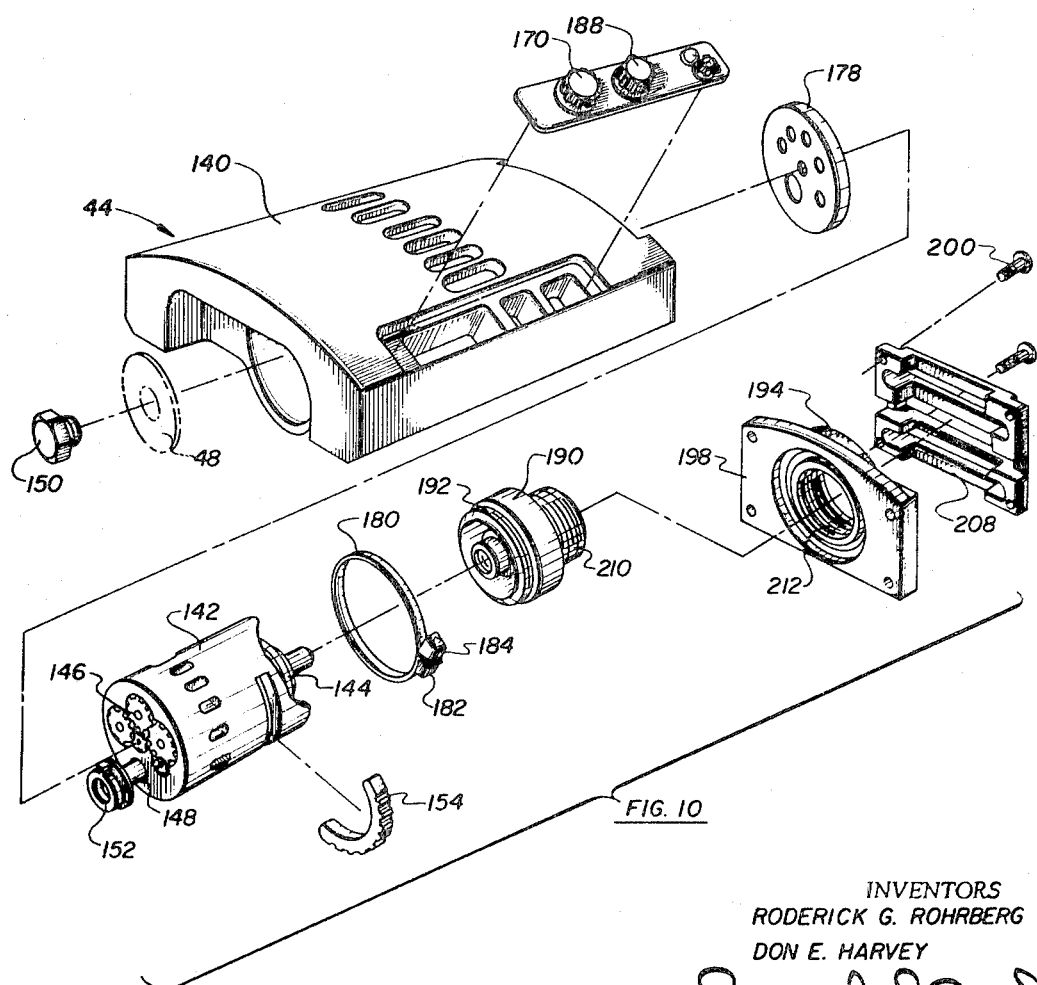
FIG. 10 is an exploded view in perspective of the structure shown in FIG. 9.

Referring to FIGS. 9 and 10, it may be seen that cutting head 44 comprises an outer structural housing 140 adapted to contain and support an inner housing 142 within which is mounted a drive motor 144. Motor 144 is connected to cutter 48 through a suitable gear train for reduction of speed as denoted by reference numeral 146 in FIG. 10, the cutter being secured to output shaft 148 by appropriate means such as holding nut 150 for securing the cutter to arbor 152. A suitable protective cover such as cover 178 is provided over gear train 146 and secured to housing 142.

Figure 11:
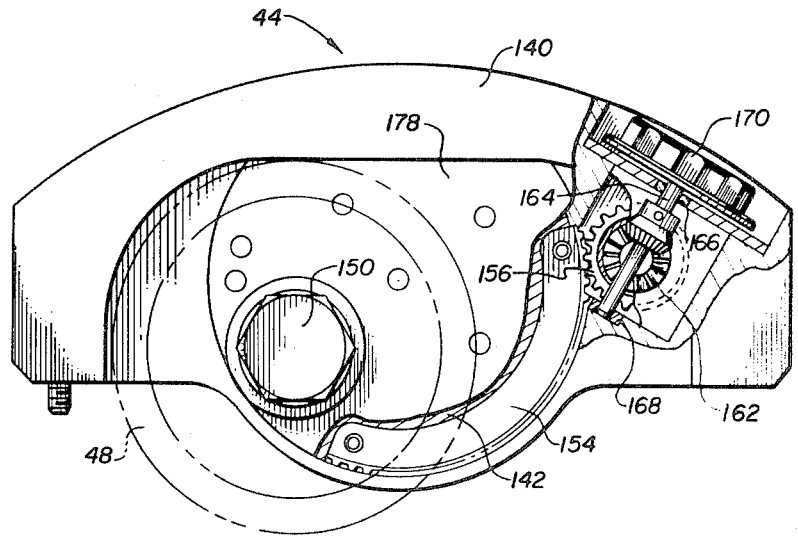
FIG. 11 is an end elevational view, partly in cross section, of the structure shown in FIGS. 7, 9 and 10.
Figure 12:
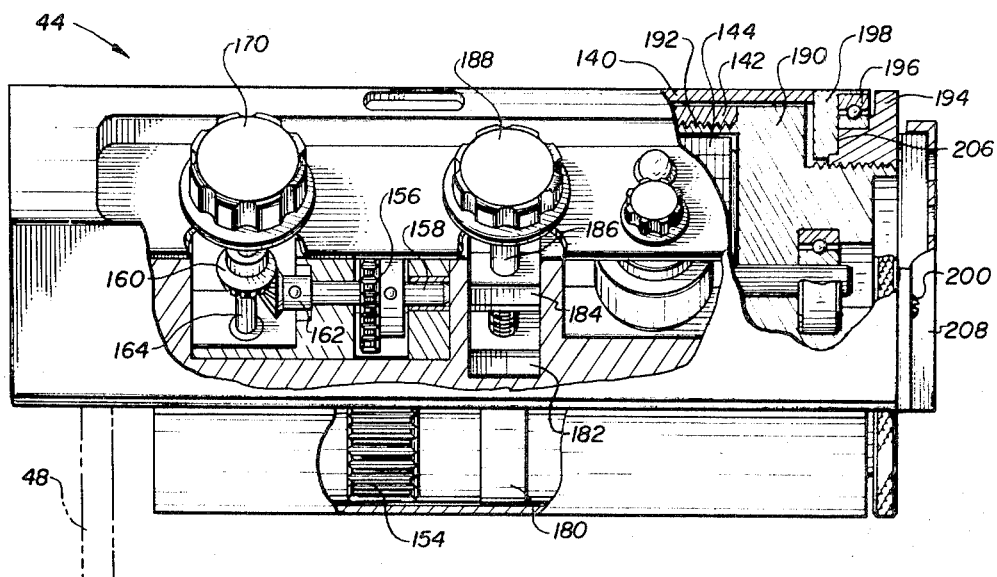
FIG. 12 is a side elevational view, partly in cross section, of the structure shown in FIGS. 9-11, inclusive.

Inner housing 142 is provided with an arcuate gear rack 154 which may be integrally formed on the housing or removably attached thereto by bolts or the like. As shown in FIGS. 11 and 12, rack 154 is operatively engaged by a pinion 156 supported on a shaft 158 mounted for rotation within housing 140 by suitable means such as bearing, bushings, or the like. Rotation is imparted to shaft 158 through bevel gears 160 and 162, the latter being secured to the stated shaft, while gear 160 is secured to shaft 164 mounted within housing 140 and rotatable relative thereto by suitable provisions such as low-friction bushings 166 and 168 seen in FIG. 11. Rotation of shaft 164 is caused by manual force applied to adjusting knob 170 affixed to shaft 164 externally of housing 140.

As a result of the foregoing structural relationships, and due to the fact that the center of rotation of shaft 148 is close to the periphery of substantially cylindrical inner housing 142 as seen from FIGS. 9–11, it will be understood that rotation of knob 170 causes rotation of inner housing 142 relative to outer housing 140. Rotation of inner housing 142 occurs about the center axis denoted by reference numeral 172 in FIG. 7, as a result of which, the axis of rotation of cutting wheel 48 may be moved from the position designated by reference numeral 174 to the position designated 176 in FIG. 7. Movement of the cutting wheel in the stated manner advances the cutting portion of the wheel 48 closer toward the workpiece or move deeply within the workpiece material, whereby rotation of housing 142 by knob 170 in the foregoing manner effectively determines the depth of cut subsequently resulting from rotation of the cutting wheel. The adjustment thus achieved is made as a preliminary step while cutting tool subassembly 44 is supported within frame 22 and prior to operation of motor 144.

Referring to FIGS. 10 and 12, holding means are also included within housing 140 for securely holding inner housing 142 in any desired position of adjustment following positioning movement by knob 170 to achieve a desired depth of cut by cutting wheel 48. The stated holding means include a strap or band clamp 180 essentially including a metallic strap having two ends in closely confronting juxtaposition. The stated two ends may be moved close together or separated from each other by appropriate means such as a block or similar metallic mass secured to each of the strap ends as suggested by blocks 182 and 184. At least one of the stated blocks has a threaded hole therethrough adapted to operatively engage a threaded shaft 186, whereby rotation of the shaft draws blocks 182 and 184 closer together or separates them to result in application of clamping force by strap 180 around housing 142 or release of the same respectively. Shaft 186 is provided with a knob 188 mounted external to housing 140 whereby release of hoop tension in strap 180 may be initially accomplished to permit rotation of housing 142 by knob 170 prior to the start of the actual cutting operation. After initial positioning of cutter 48 is complete, the final position of adjustment is therefor maintained by turning knob 188 in the direction resulting in tightening of band clamp 180 about the housing to hold the same in fixed position relative to housing 140.

Provisions are further included in subassembly 44 for axial adjustment of cutter 48 relative to frame 22 prior to the cutting operation. Referring to FIGS. 10 and 12, the stated provisions may be seen to include end closure element 190 which is secured to one end of inner housing 142 by thread 192 in the manner shown. Housing 142 is translationally movable along its longitudinal axis relative to housing 140, and force applied to element 190 is adapted to cause such movement when the component parts are assembled in operative relationship. The mentioned force is applied to element 190 by a knurled adjusting wheel 194 which is supported on bearing 196 contained in a retaining cap 198 which is joined to outer housing 142 by suitable means such as screws 200 shown in FIG. 10. Wheel 194 is restrained against lateral movement due to sliding surface contact on one side thereof with surface 206 of retaining cap 198 and on the other side thereof with protective cover 208 which is secured to cap 198 and housing 140 by the mentioned screws 200. Due to the mentioned lateral restraint wheel 194, it will be understood that rotation of the wheel results in axial movement above end closure element 190 due to its threaded inner engagement with wheel 194 along the area designated by reference numerals 210 and 212 in FIGS. 10 and 12. Translational movement of element 190 in the foregoing manner results in similar movement of housing 142 to which element 190 is secured as described above.

The cutting position of wheel 48 will be understood to depend primarily upon the location at which frame 22 and cutting tool subassembly 44 supported thereon are placed upon the workpiece. The means for laterally positioning cutter 48 with respect to the workpiece described above will be understood to constitute precision means for final adjustment of the cutter without necessitating movement of the entire supporting frame 22.

Referring to FIGS. 13–18, a more detailed showing of welding tool subassembly 54 may be seen than that shown by FIG. 8 briefly mentioned hereinabove. Thus, for example, welding tool subassembly 54 comprises a frame 220 having a lid 222 hingeably secured thereto for relative pivoting movement about a hinge center line 224 through a hinge pin 226. The various items secured to lid 220 include mounting means for adjustably supporting and for oscillating electrode 56, and wire feed means for continuously supplying weld metal into the puddle during the welding operation. The detailed mounting arrangement for adjustably supporting electrode 56 may be seen from FIG. 18 to include horizontal slide block 228 supported for translational movement relative to lid 222 along two elongate guides of which only guide pin 230 is shown in FIG. 18, 228 other being identical therewith and both passing through a pair of holes 232 in block 228 and secured at each end of the guide pins within holes 234 in lid 222. Movement of horizontal slide block 228 relative to stationary support pins or guides 230 is caused by adjusting knob 236 provided for this purpose and seen particularly in FIG. 15. Knob 236 is supported on slide block 228 for rotational movement relative thereto by suitable means such as bearing support 238. Knob 236 is further provided with beveled gear 240 operatively interengaging beveled pinion 242 which is formed on the end of a threaded shaft 244. Shaft 244 is threadably engaged within a hollow cylindrical support member 246 which in turn is secured to lid 222 by suitable means to prevent its rotation such as pin 248. Because support member 246 is nonrotational and immovable with respect to lid 222, it will be understood that rotation of knob 236 and shaft 244 causes a translational movement of the shaft which applies thrust to horizontal slide 228 causing lateral movement of the slide relative to lid 222 in the view shown by FIG. 15, for example. The stated horizontal movement of slide 228 causes corresponding movement of electrode 56 which is indirectly mounted on horizontal slide block 228 by means which will now be described.

As seen particularly from FIGS. 14 and 18, horizontal slide block 228 is provided with a plurality of pins 250, 252, 254, and 256, all of which extend vertically downward from horizontal slide block 228 in the view shown by FIG. 14. The mentioned four pins are operatively engaged with a corresponding number of holes in a vertical slide block 258 which is translationally movable in a direction normal to the direction of adjustable movement of horizontal slide block 228. Thus, pins 250, 252, and 254 are generally cylindrical guides slidably engaging holes 260, 262 and 264, respectively. Force is applied to produce vertical movement of slide block 258 in the view shown by FIG. 15, for example, by vertical adjusting knob 266 which is formed or otherwise secured to the end of threaded shaft or pin 256. Pin 256 is rotationally mounted in horizontal slide block 228 by suitable means such as bearing support assembly 268 which allows rotation of the pin but prevents vertical movement of the pin relative to slide block 228. Thus, rotation of knob 266 and pin 256 causes vertical movement of slide block 258 relative to horizontal slide block 228 and lid 222 by reason of the threaded interengagement of pin 256 with hole 270 seen more particularly in FIG. 18. The foregoing vertical movement of slide block 258 will be understood to cause corresponding vertical movement of electrode 56 in the view shown, for example, by FIG. 15, because the electrode is supported on the vertical slide block as shown by FIG. 17 and discussed below.

Electrode 56 may be of conventional type such as used in tungsten inert gas (TIG) welding contained within a ceramic cup 272 in a manner known to the prior art, the details of such mounting not being of significance in the inventive concept disclosed herein. Gas cup 272 and related internal components is adapted for support on mounting block 274. Block 274 is provided with a substantially cylindrical projection of tubular shape 276 mounted for reciprocal pivoting movement within suitable spaced-apart bearing support means 278 and 280 secured to vertical slide block 258 shown particularly by FIGS. 17 and 18. The stated reciprocating movement of tube 276 relative to block 258 is transmitted through a block 274 whereby electrode 56 is likewise pivotally reciprocated about the same rotation axis as tube 276 which coincides with the longitudinal center axis 282 of the tube. Pivotal movement of tube 276 thus results in oscillating of electrode 56 as shown in FIG. 16 and occurs by application of force to tube 276 in the manner now to be described.

Referring to FIGS. 16 and 17, it may be seen that a generally C-shaped yoke 284 having flange portion 286 is secured to the hollow distal end 288 of tube 276 by suitable means such as holding screw 290 and key 292 which operatively interengages a pair of aligned grooves in tube 276 and hole 294 in the stated flange. Yoke 284 is further provided with a pair of spaced-apart projecting arms 296 and 298 adapted to lightly contact the outer periphery of a circular bearing 300 at diametrically opposite locations as shown in FIG. 16. Bearing 300 is operatively associated with an oscillating subassembly shown more particularly in FIG. 19.

Referring to FIG. 19, it may be seen that the oscillation subassembly for oscillating electrode 56 about rotation axis 286 includes a drive motor 302 having a rotatable output shaft 304. Motor 302 is preferably a variable speed motor, and shaft 304 rotates in a uniform direction at substantially constant adjusted speed about a fixed axis of rotation through the center of the shaft. A generally cylindrical bushing 306 has a nonconcentric hole 308 therethrough substantially corresponding in size with shaft 304 along a portion of its length and adapted to receive the shaft in eccentric relationship with the bushing. Holding means to prevent relative movement between shaft 304 and bushing 306 may take any suitable form, and in the illustrative case shown by FIG. 19, comprise setscrew 310 threadably engaging hole 311 and adapted to bear against shaft 302 whereby bushing 306 rotates with the shaft. However, for reasons described more particularly below, hole 308 is not concentrically located in substantially cylindrical bushing 306 but is offset from the geometric longitudinal center of the bushing. Bushing 306 is further provided with a circular flange 312. Eccentric collar 314 having three successive diametrically stepped cylindrical surface 316, 318 and 320, is adapted to be mounted on eccentric bushing 306 by means of hole 322 which passes completely through collar 314 and is eccentrically located relative to the geometric center of the collar. Hole 322 is sized to permit close sliding contact between the hole surface and the outer cylindrical surface of bushing 306. Collar 314 is rotatably movable about bushing 306 for a purpose described more fully below.

Resiliently biased holding means for holding collar 314 in any desired position of adjustment relative to bushing 306 is provided in the structure shown by FIG. 19 in the form of detent ring 324 having a plurality of detents 326 diametrically spaced on one surface thereof as shown. Detents 326 are adapted to receive and retain a pair of radially extending ridges 328 on the surface of collar 314. Detent ring 324 is further provided with a diametrical groove 330 adapted to receive a retaining pin 332. A retaining cap 334 has a disc portion 336 adapted to bear against the surface of ring 324 and a center boss 338 sized to fit within opening 308 of bushing 306. A resilient ring 340 of suitable material such as a rubber O-ring is adapted to seat between the flat confronting surfaces of detent ring 324 and disc 336 on the retaining cap 334. Boss 338 has a hole 342 therein sized and adapted to receive retaining pin 332. Assembly of the various components shown in the exploded view of FIG. 19 begins with placement of bushing 306 on shaft 304 and rotation of said screw 310 until the bushing is firmly secured on the shaft. Circular bearing 300 is seated upon surface 316 of collar 314 and the collar is then placed on the bushing so that bearing 300 is wedged between flange 312 of the bushing and the flat lateral surface formed between cylindrical areas 316 and 318. Thereafter, detent ring 324 is placed in contact with collar 314 and around bushing 306 so that groove 330 is aligned with a hole 344 in bushing 306 sized and adapted to receive retaining pin 332. Ring 340 is placed against the flat end surface of ring 324 and retaining cap 336 is placed against the ring with boss 338 situated within hole 308 of bushing 306 with hole 342 in aligned under hole 344. With the parts thus assembled, retaining pin 332 is placed through groove 330, holes 344 and 342, thus retaining the assembly in the operative relationship suggested, for example, in FIG. 17. With the parts thus assembled in operative relationship, it will be understood that detent ring 324 is not rotatable relative to bushing 306 due to the restraining influence of pin 332 lodged in diametral groove 330 of the ring and through hole 344 of the bushing. However, collar 314 is rotatably adjustable relative to bushing 306, and such rotation is done manually such as by holding detent ring 324 stationary and applying sufficiently great rotational force to surface 320 of the collar to overcome the compressive biasing force of ring 340 whereby radial ridge 328 is forced out of lodgement within any one of detents 326 and into lodgement with another of such detents. In the absence of rotational force as required to adjust collar 314 in the stated manner, any diametral pair of detents 326 holds collar 314 in a stationary position of adjustment until the mentioned biasing force is again overcome by manual rotation of the collar relative to ring 324.

Referring to FIGS. 10a and 19b, the effect of the foregoing adjustment of collar 314 relative to bushing 306 may be seen. Thus, in FIG. 19a, the center of rotation of shaft 304 coincides with the geometric center of collar 314 and this position of adjustment is identifiable with zero oscillation of electrode 56. FIG. 19b shows the position of adjustment identifiable with maximum oscillation of yoke 284 and electrode 56 wherein collar 314 is rotated relative to bushing 306 so that the geometric center of the collar is a maximum distance from the center of rotation of shaft 304. In the foregoing position of adjustment, a peripheral point 346 on the edge of collar 314 will follow a circular rotational path indicated by dash line 348 having its center at the rotation axis of shaft 304. The foregoing action will produce reciprocating movement of yoke 284 about the axis of rotation 282 in the manner generally suggested by FIG. 16. The amount of distance which the lower distal end of electrode 56 will move in response to the foregoing eccentricity of collar 314 and bearing 300 mounted thereon will depend upon the relative distance between point 346 and the axis of shaft 304, as well as the relative distance between axis 282 and the lower distal end of the electrode.

Such distances, and their proportional relationship to each other, can be varied in the size or selection of component parts to produce any particular amount of oscillation distance or dwell time desired for each welding operation involving use of the device disclosed herein. In any case, however, it is of significance that the attachment of electrical and cooling water flexible conduits 350, 352 to block 274 as shown in FIGS. 14, 16 and 17 is located closely proximate axis 282, whereby movement of such conduits even during maximum oscillation of electrode 56 is always minimized. Moreover, it may be seen from FIGS. 14 and 18 that flexible conduits 350 and 352 enter welding tool subassembly 54 through one end of hollow hinge pin 226 and exit through opening 354 in the pin, further minimizing bends and stresses in the conduits which would otherwise result from movement of lid 222 in opening and closing.

With further regard to FIGS. 13, 14 and 18, it may be seen that welding tool subassembly 54 also includes provision for feeding welding wire to the vicinity of the weld puddle normally resulting from operation of electrode 56. The stated means include a spool 356 for supporting the coiled wire 358, a variable speed motor 360 for driving spools within gearbox 362 at suitably adjusted speed to feed wire 358 through a guide tube 364 directed toward the mentioned weld puddle. The details of the wire feed system thus broadly suggested form no critical part of the overall concept claimed in this case and accordingly need not be further discussed. Moreover, various means known to the prior art might be adapted to perform the functions of the foregoing wire feed system by those skilled in the art without departing from the scope of the invention disclosed herein.

Referring to FIG. 20, an illustrative arrangement for the electromechanical relationship of the various detailed components disclosed herein is schematically shown. Thus, separate power sources are preferably used for each of the components discussed hereinabove, operatively related by suitable circuitry to program control means 366 which may comprise any one of several automatic welding control systems known to the prior art, the details of which form no part of the invention claimed hereinbelow and accordingly need no further mention.

From the description set forth above in connection with the structure shown by the drawings, it will be understood that the combination tool thus disclosed in characterized by lightness, portability, and extreme compactness for operation within crowded installation as may be involved for in-place welding. Alignment of the device as required for precise cutting followed by precision welding is accomplished with great ease and direct visibility of the cutting or welding tool. The mounting system comprising rollers 24, 26, 28 and 30 adapts the combination tool to a wide range of different workpiece sizes and materials. The cutting and welding operations are characterized by extreme rapidity, since no major readjustment of tool position is required or involved in the exchange of cutting tool subassembly 44 and welding tool subassembly 54 in frame 22. Moreover, it may be seen from FIG. 5, for example, that idler rollers 24 and 26 shown in contact with two different diameters of workpiece 32 and 34 are substantially in horizontal alignment with each other, whereby the arc gap between electrode 56 and either of the stated workpieces will be substantially the same regardless of workpiece diameter. Fine adjustment of the arc gap is accomplished within the limited range of movement permitted by translationally movable slide blocks 228 and 258. Many other functional advantages in addition to those described above have been found to result from the structure described herein. The space envelope around tube 10 or 12 required for gyration of tool 20 is relatively small, due to the fact that the tool is essentially wrapped around the workpiece in snugly gripping relationship therewith rather than rolled around a track. Thus, the center axial cavity or passageway through mobile chassis or carriage 22 forms an arcuate vault within which tube 10 or 12 is automatically substantially centered when rollers 24, 26, 28 and 30 are moved into gripping relationship with the workpiece. The elongate or cylindrical shape of the rollers results in self-guiding of the chassis during its rotation about the tubular workpiece, since each of the rollers contacts the tube along a straight line of contact parallel with both the axes of roller rotation and the center longitudinal axis of the workpiece. As a result, angular misalignment of frame 22 relative to the foregoing workpiece center axis is effectively prevented, whereas prevention of such misalignment would not result if small wheels or the like were used instead of rollers to support frame 22. Due to the stated self-guiding effect of straight line contact between the rollers and the workpiece, such contact should extend a distance at least as great as the diameter of the tubular workpiece, and preferably a greater distance.

The restraint provided by guide elements 138 seen in FIGS. 4 and 6 limits adjusting movement of idler rollers 24 and 26 to a common linear path substantially normal to the rotation axes of both such rollers and results in the surface of the tubular workpiece being in operative relationship with two subassemblies 44 and 54 regardless of tube diameter, as suggested by tubes 32 and 34 in FIG. 5. Although slight variations in arcing distance during welding operations with tool subassembly 54, for example, might result from drastic differences of diameter between different workpieces, the foregoing advantage of the structure disclosed herein permits such minor variations to be easily corrected by the limited adjusting movement of slide blocks 228 and 258 as discussed hereinabove. The irreversible character of worm gear and pinion interengagement between jackscrew 38 and pinion segments 62 and 64 results in positive holding force being applied to both segments even without locking means on the jackscrews, whereby no lessening of holding force on rollers 24, 26, 28 and 30 can result from reaction loads applied to the pinion segments by the rollers.

While the particular details set forth above and in the drawings are thoroughly capable of providing the advantages herein stated, the structure and method thus disclosed are merely illustrative and could be modified or varied to produce the same results without departing from the scope of the inventive concept as defined in the appended claims.

We claim:

1. A method of automatically trimming and in-place welding tubular workpiece components within closely confined areas, said method comprising:
   supporting a frame on one of said components by cylindrical rollers having parallel lines of contact with said one component, said lines further being parallel with the longitudinal center axis of said one component,
   mounting machine tool means on said frame in operative relationship with said one component for cutting same,
   rotating same frame on said rollers about said one component during operation of said machine tool means to progressively cut through said one component on a plane normal to said center axis,
   replacing said tool means by mounting welding tool means on said frame in operative relationship for progressive fusion welding on said one component,
   placing another tubular workpiece component in axial alignment with and abutting said one component along said cutting plane, and
   rotating said frame on said rollers during operation of said welding means to progressively fusion weld said two workpiece components together along a peripheral weld seam substantially defined by said cutting plane.

* * * * *